(12) United States Patent
Cheung

(10) Patent No.: US 11,804,091 B2
(45) Date of Patent: Oct. 31, 2023

(54) CLOUD DOOR LOCK CONTROL SYSTEM WITH IDENTIFICATION OF TIME VARIED 2D CODES AND IMAGES

(71) Applicant: Wai Kin Cheung, Hong Kong (CN)

(72) Inventor: Wai Kin Cheung, Hong Kong (CN)

( * ) Notice: Subject to any disclaimer, the term of this patent is extended or adjusted under 35 U.S.C. 154(b) by 0 days.

(21) Appl. No.: 17/670,539

(22) Filed: Feb. 14, 2022

(65) Prior Publication Data

US 2023/0260346 A1    Aug. 17, 2023

(51) Int. Cl.
*G07C 9/20* (2020.01)
*G06K 7/14* (2006.01)
*H04L 67/125* (2022.01)
*G07C 9/00* (2020.01)

(52) U.S. Cl.
CPC ............. *G07C 9/20* (2020.01); *G06K 7/1417* (2013.01); *G07C 9/00182* (2013.01); *H04L 67/125* (2013.01); *G07C 2009/0023* (2013.01)

(58) Field of Classification Search
CPC .. G07C 9/00309; G07C 9/00571; G07C 9/20; G07C 9/29; G07C 2009/00412; G07C 9/00182; G07C 2009/0023; G06K 7/1417; H04L 9/32; H04L 67/125
See application file for complete search history.

(56) References Cited

U.S. PATENT DOCUMENTS

| | | | |
|---|---|---|---|
| 9,367,978 B2 * | 6/2016 | Sullivan | G07C 9/00571 |
| 9,396,598 B2 * | 7/2016 | Daniel-Wayman | G07C 9/27 |
| 9,449,449 B2 * | 9/2016 | Evans | H04W 12/082 |
| 9,690,272 B2 * | 6/2017 | Chin | F24F 11/30 |
| 10,163,105 B1 * | 12/2018 | Ziraknejad | G06Q 20/3274 |
| 10,229,548 B2 * | 3/2019 | Daniel-Wayman | G07C 9/23 |
| 10,347,059 B2 * | 7/2019 | Shirai | G07C 9/00571 |
| 10,445,956 B2 * | 10/2019 | Kamkar | G07C 9/28 |
| 10,475,264 B2 * | 11/2019 | Jin | H04W 12/00 |
| 10,769,877 B2 * | 9/2020 | Kaye | H04W 48/16 |
| 10,846,958 B2 * | 11/2020 | Raduchel | G07C 9/00896 |
| 10,997,806 B2 * | 5/2021 | Earles | G07C 9/00563 |
| 11,238,433 B2 * | 2/2022 | Jamkhedkar | G06K 19/06037 |
| 11,244,528 B2 * | 2/2022 | Eathakota | H04W 4/029 |
| 11,295,563 B2 * | 4/2022 | Kuenzi | G07C 9/00309 |
| 2012/0280790 A1 * | 11/2012 | Gerhardt | H04L 63/0428 340/5.61 |
| 2014/0049363 A1 * | 2/2014 | Ahearn | G07C 9/00174 340/5.51 |
| 2014/0051425 A1 * | 2/2014 | Ahearn | G07C 9/00571 455/420 |

(Continued)

*Primary Examiner* — Curtis J King

(57) ABSTRACT

A cloud door lock control system identifies time varied 2D codes and images. A cloud device transmits the encryption codes of doors to be opened, the time periods for opening the doors, and the user's encryption codes to the mobile phone. The mobile phone stores these values in a memory. A mobile phone APP receives these values and encrypts them by using a specific encrypting code. The encoding way for the encoding unit is time varied. When the cloud device receives the QR code from a card reader, it is decoded and is compared with those stored in the cloud device to determine whether the door is necessary to be opened. The cloud device stores mobile phone holder's images which is transferred to the APP. The mobile phone holder's image is displayable on the mobile phone for determining whether the mobile phone holder is acceptable to pass through the door.

10 Claims, 6 Drawing Sheets

(56) References Cited

U.S. PATENT DOCUMENTS

| | | | |
|---|---|---|---|
| 2015/0356801 A1* | 12/2015 | Nitu | G07F 9/002 |
| | | | 340/5.61 |
| 2016/0321847 A1* | 11/2016 | Briskey | G07C 9/27 |
| 2017/0103647 A1* | 4/2017 | Davis | H04W 12/068 |
| 2017/0124792 A1* | 5/2017 | Schoenfelder | G07C 9/00722 |
| 2017/0265026 A1* | 9/2017 | Ahearn | H04W 4/80 |
| 2018/0053363 A1* | 2/2018 | Ravida | H04N 7/186 |
| 2019/0096148 A1* | 3/2019 | Hopkins | G07C 9/00571 |
| 2019/0172281 A1* | 6/2019 | Einberg | G07C 9/27 |
| 2019/0172285 A1* | 6/2019 | Jin | H04W 4/80 |
| 2019/0205865 A1* | 7/2019 | Jamkhedkar | G06K 19/06037 |
| 2019/0333301 A1* | 10/2019 | Imanuel | G07C 9/00571 |
| 2019/0371101 A1* | 12/2019 | Friedli | G07C 9/00571 |
| 2020/0040649 A1* | 2/2020 | Harvey | H04W 4/80 |
| 2020/0043271 A1* | 2/2020 | Anderson | G07C 9/00309 |
| 2020/0250909 A1* | 8/2020 | Li | G06F 16/258 |
| 2020/0372743 A1* | 11/2020 | Miller | G07C 9/257 |
| 2021/0006933 A1* | 1/2021 | Dean | G16Y 40/10 |
| 2021/0012599 A1* | 1/2021 | Carpenter | H04L 12/66 |
| 2021/0084494 A1* | 3/2021 | Angelov | H04W 12/08 |
| 2021/0096699 A1* | 4/2021 | Ormond | G06F 3/04883 |
| 2021/0134096 A1* | 5/2021 | Pukari | H04B 5/0037 |
| 2021/0170892 A1* | 6/2021 | Albors Ripoll | H02J 7/0042 |
| 2021/0279983 A1* | 9/2021 | Imanuel | G07C 9/00309 |
| 2021/0318888 A1* | 10/2021 | Abbasian | G06F 11/3051 |
| 2021/0321223 A1* | 10/2021 | Adachi | H04W 12/069 |
| 2021/0390810 A1* | 12/2021 | Kuenzi | G07C 9/37 |
| 2022/0174244 A1* | 6/2022 | Guibene | G06V 20/52 |
| 2022/0207946 A1* | 6/2022 | Voss | G07C 9/257 |
| 2022/0230498 A1* | 7/2022 | Prevost | G06V 40/172 |
| 2023/0047088 A1* | 2/2023 | Blasband | G07C 9/00571 |

\* cited by examiner

CLOUD DOOR LOCK CONTROL SYSTEM WITH IDENTIFICATION OF TIME VARIED 2D CODES AND IMAGES

FIELD OF THE INVENTION

The present invention is related to control of opening of doors, and in particular to a cloud door lock control system with identification of time varied 2D codes and images

BACKGROUND OF THE INVENTION

Currently, 2D codes are used as a tool for identification of a profile so as to unlock a door, such as a home door, an office door, a factory door, a door in the markets, or for unlocking of a storing cabinet in a bus station. 2D codes are codes for storing specific information and can be attached to an object. Currently, 2D codes are widely used to the identification of personal information. For example, a mobile phone APP could generate a specific 2D code which presents the profiles of a person. A controller in a door can scan the 2D code and decode it so as to identify the profile for proceeding operations.

Above mentioned prior art for identifying 2D codes is permanent, while if another person having the 2D code, he (or she) still can pass the identification. Therefore, if this 2D code is copied illegally by another person, he can pass the identification of the profile. This prior way is unbeneficial to the control of members and is a serious threaten to the safety of the owners.

Conventionally, controllers are installed in respective doors, and decoders built within the controller are used in decoding and identification. This conventional way is low safety and need high cost. Further, if these controllers are installed individually for the doors and are not interconnected, it is unbeneficial to the management of central controller.

Above mentioned for generating 2D codes by using mobile phones still has certain problem, that is: when the mobile phone is lost and is picked by other person and is got by others illegally. The illegal users still can pass the door so as to induce some problems in door control.

SUMMARY OF THE INVENTION

Accordingly, the object of the present invention is to provide a cloud door lock control system with identification of time varied 2D codes and images, wherein the controller (that is the cloud device 10) are installed in cloud, instead of being at the door end. QR code is transferred to the cloud device and then is decoded and identified in the cloud device. The cost for installing the controllers is saved. Furthermore, a plurality of doors in one unit use same system and door control is performed by the cloud device. Furthermore the messages for door control and users are stored in the cloud device and thus it is unnecessary to worry about the stealing of the message. The cloud device can understand the status of various doors in the unit and thus can monitor different areas in the unit effectively.

To achieve above object, the present invention provides a cloud door lock control system with identification of time varied 2D codes and images, comprising: a cloud device for transmitting a mobile phone APP to a mobile phone; the cloud device storing all encryption codes of doors to be opened, time periods for opening the doors, and user's encryption codes; the cloud device frequently transmitting the encryption codes of doors to be opened, the time periods for opening the doors, and the user's encryption codes to the mobile phone based on a preset period through a first communication channel and the mobile phone stores these values in a memory; a mobile phone APP for receiving the encryption codes of doors to be opened, the time periods for opening the doors, and the user's encryption codes emitted from the cloud device; wherein in use, the cloud device further transmits the user's encryption code to the user by a second communication channel; the user's encryption code is inputted to a mobile phone with a mobile phone APP to replace the previous user's encryption code stored in the mobile phone APP and then the user's encryption code is stored in a memory in the mobile phone; the mobile phone APP includes an encoding unit which uses an specific encrypting code to further encrypting the encryption code of the door to be opened, the door time periods for opening the door and the user's encryption code and then converting them into a QR code; and wherein the encoding way for the encoding unit is time varied, that is, the QR code from the encoding unit is only retained for a preset time period; after the preset time period has elapsed, the encoding unit generates another QR code for the encryption code of the door to be opened, the door time periods for opening the door and the user's encryption code; the cloud device also stores the encryption code of the door to be opened, the door time periods for opening the door and the user's encryption code, and encrypting way of the encoding unit and the specific encrypting codes of the encoding unit; and therefore, the cloud device can decode the QR code generated by the encoding unit; a card reader positioned on the door and signally connected to the cloud device; the card reader serving for reading the QR code in the mobile phone and transfers the QR code to the cloud device for decoding; and wherein when the cloud device receives the QR code from the card reader, the QR code is decoded to obtain the encryption code of the door to be opened, the door time periods for opening the door and the user's encryption code; these decoding data is compared with the respective the encryption code of the door to be opened, door time periods for opening the door and user's encryption code stored in the cloud device; if they are matched, the card reader transfers a signal for opening the door to the door for opening the door; if in the comparing, they are unmatched, the cloud device transfers an error message to the mobile phone. The cloud device stores mobile phone holder's images; where the mobile phone holder means a person who are acceptable by the cloud device to enter into the doors and the mobile phone holder has relations to the mobile phone; and the mobile phone holder's image is transferred to the mobile phone APP by which the mobile phone holder's image is displayable on the mobile phone for determining whether the mobile phone holder is acceptable to pass through the door.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

With reference to FIGS. 1 to 6, the structure of the present invention is illustrated in the following.

Figure 1:
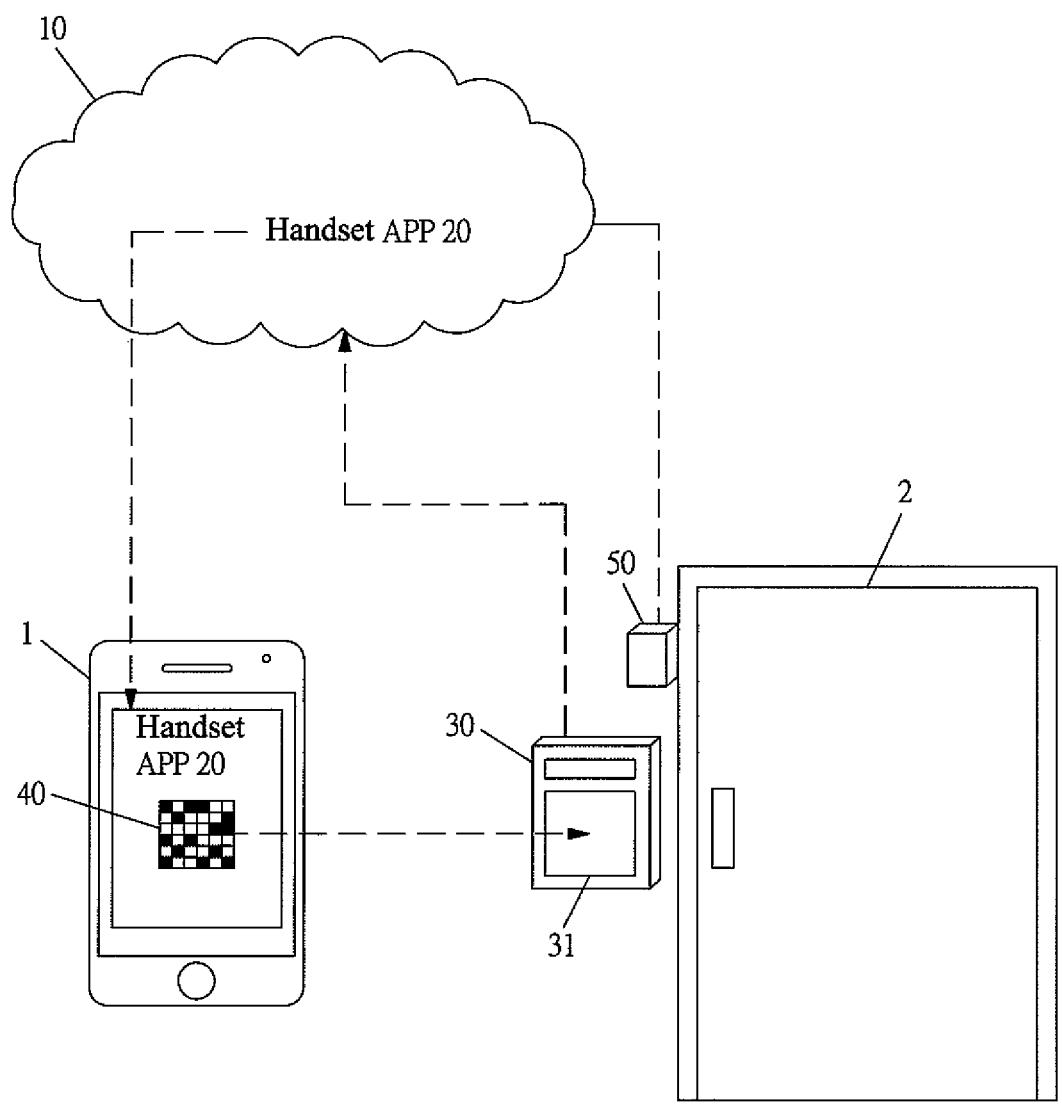
FIG. 1 is a schematic view about the practical installation of the present invention.

A cloud device 10 serves to transmit a mobile phone APP 20 to a mobile phone 1, as illustrated in FIG. 1. The cloud device 10 stores all the encryption codes of doors 2 to be opened, the time periods 62 for opening the doors, and the user's encryption codes 63, and mobile phone holder's images 64. The mobile phone holder's images may be at least one of static photos or at least one dynamic videos. The mobile phone holder means a person which is acceptable by the cloud device 10 to enter into the doors 2 and the mobile phone holder has certain relations with the mobile phone 1.

A mobile phone APP 20 serves to receive the encryption codes 61 of doors 2 to be opened, the time periods 62 for opening the doors, and the user's encryption codes 63 or mobile phone holder's image 64. A user's encryption code is dedicated to a specific mobile phone 1, that is, the specific user's encryption code is dedicated to a specific mobile phone 1.

Figure 2:
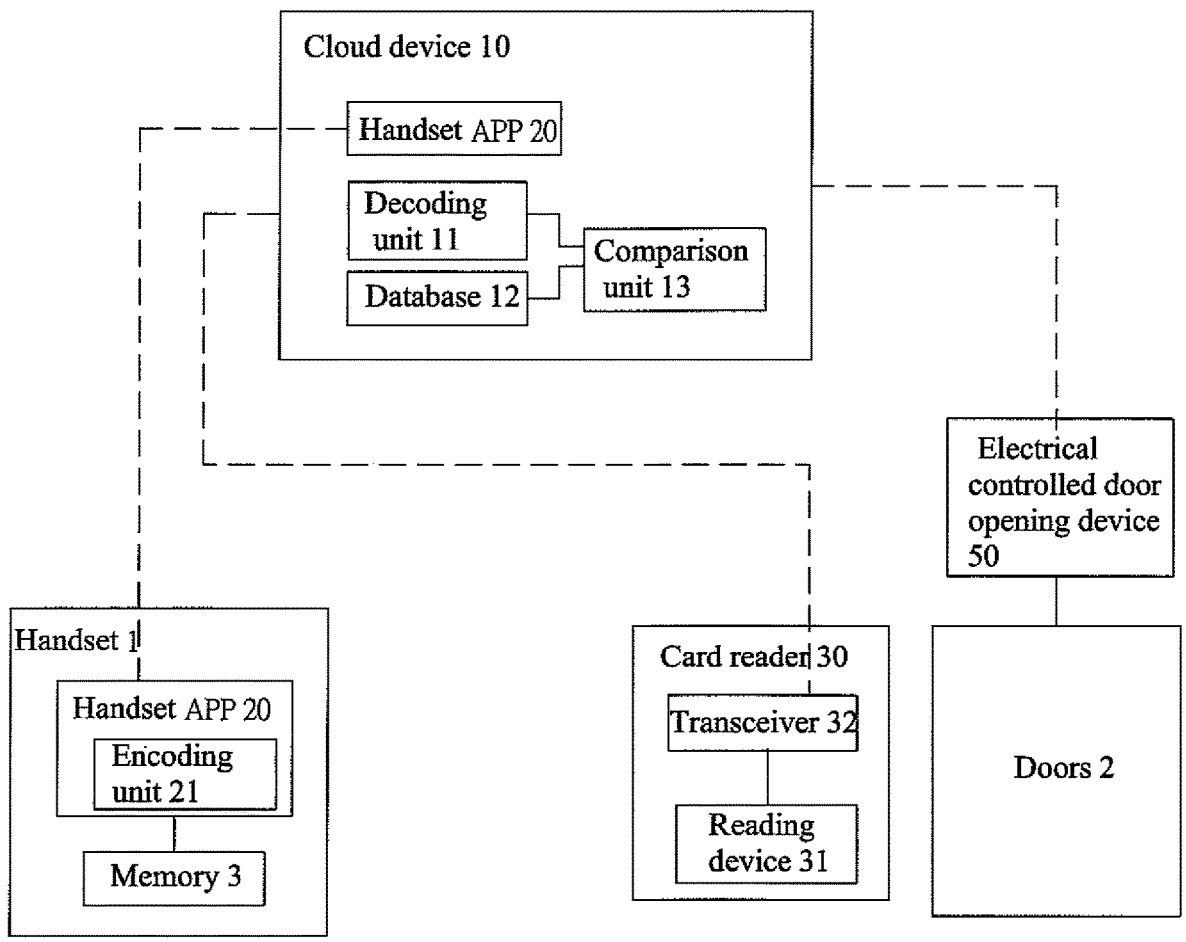
FIG. 2 is a functional block diagram of the present invention.
Figure 6:
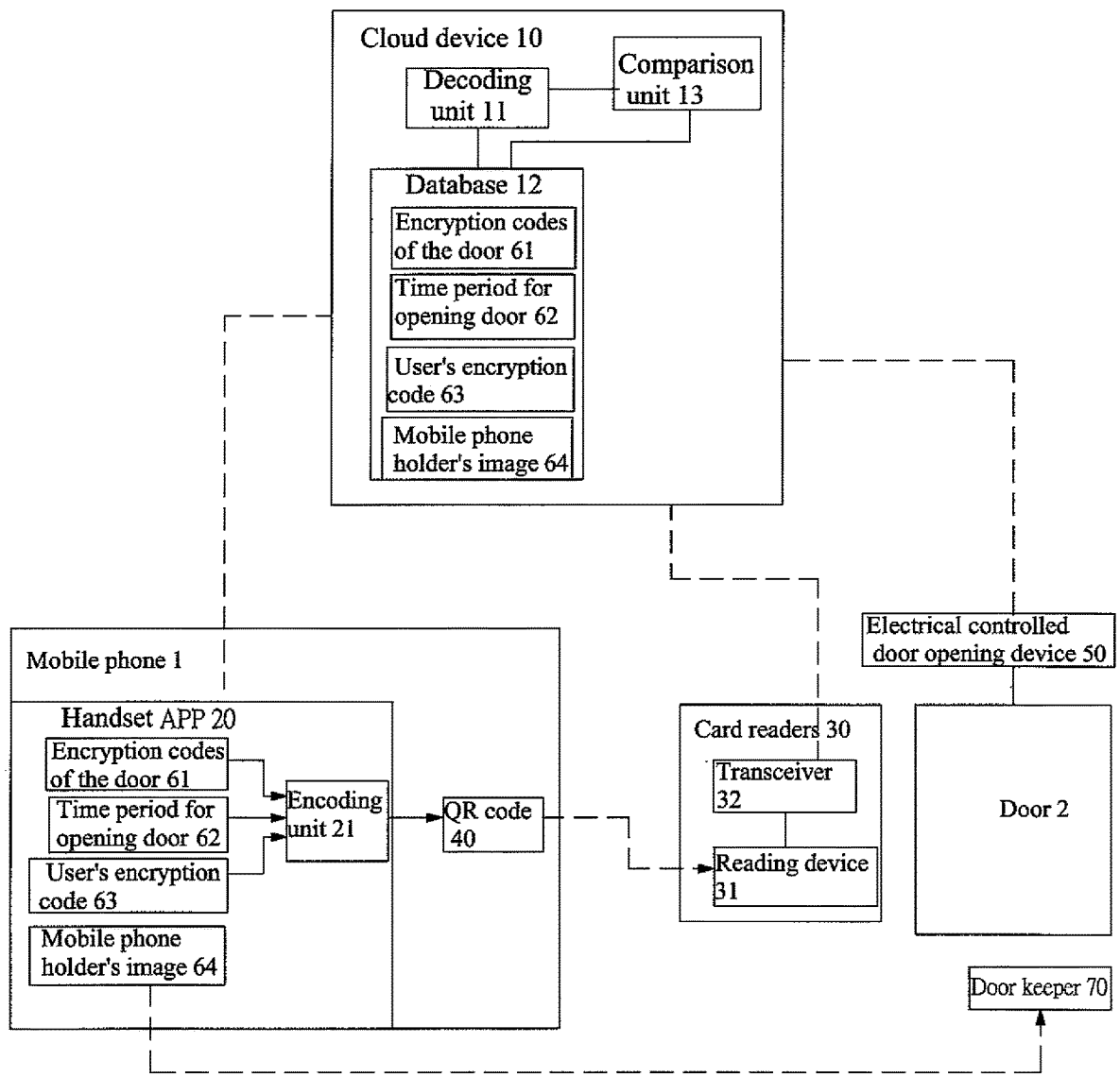
FIG. 6 is another block diagram for the components of the present invention.

In use, the cloud device 10 further transmits the user's encryption code 63 to the user by using another communication channel, such as short messages, or emails, etc. The user can input the user's encryption code 63 to a mobile phone 1 with a mobile phone APP 20 and then the user's encryption code 63 is stored in a memory 3 to replace the previous user's encryption code. As illustrated in FIGS. 2 and 6, the mobile phone APP 20 includes an encoding unit 21 which uses an specific encrypting code to further encrypting the encryption code 61 of the door 2 to be opened, the door time periods 62 for opening the door and the user's encryption code 63 and then converting them into a QR code 40.

The way for transferring the encryption code 61 of the door 2 and the door time periods 62 will be described herein. At a preset timing before opening the door 1, the cloud device 10 transfers them to the mobile phone APP 20 of the mobile phone 1 by short messages or emails or by directly transferring to the mobile phone 1, or by other ways. Or when the user desires to open the door 2, the mobile phone 1 of the user notifies the cloud device 10, and then the cloud device 10 transfers the encryption code 61 of the door 2 to be opened and the door time periods 62.

The cloud device 10 may control specific ones of doors 2 (if there are many doors 2). Therefore, in opening the specific door 2, the mobile phone 1 of the user notifies the cloud device 10 to open the specific door which is identified by predetermined ways (such as images of the specific door, or a designated number of the door), then the cloud device 10 transfers the encryption code 61 of the specific door 2 to be opened, the door time periods 62 of the specific doors.

Figure 5:
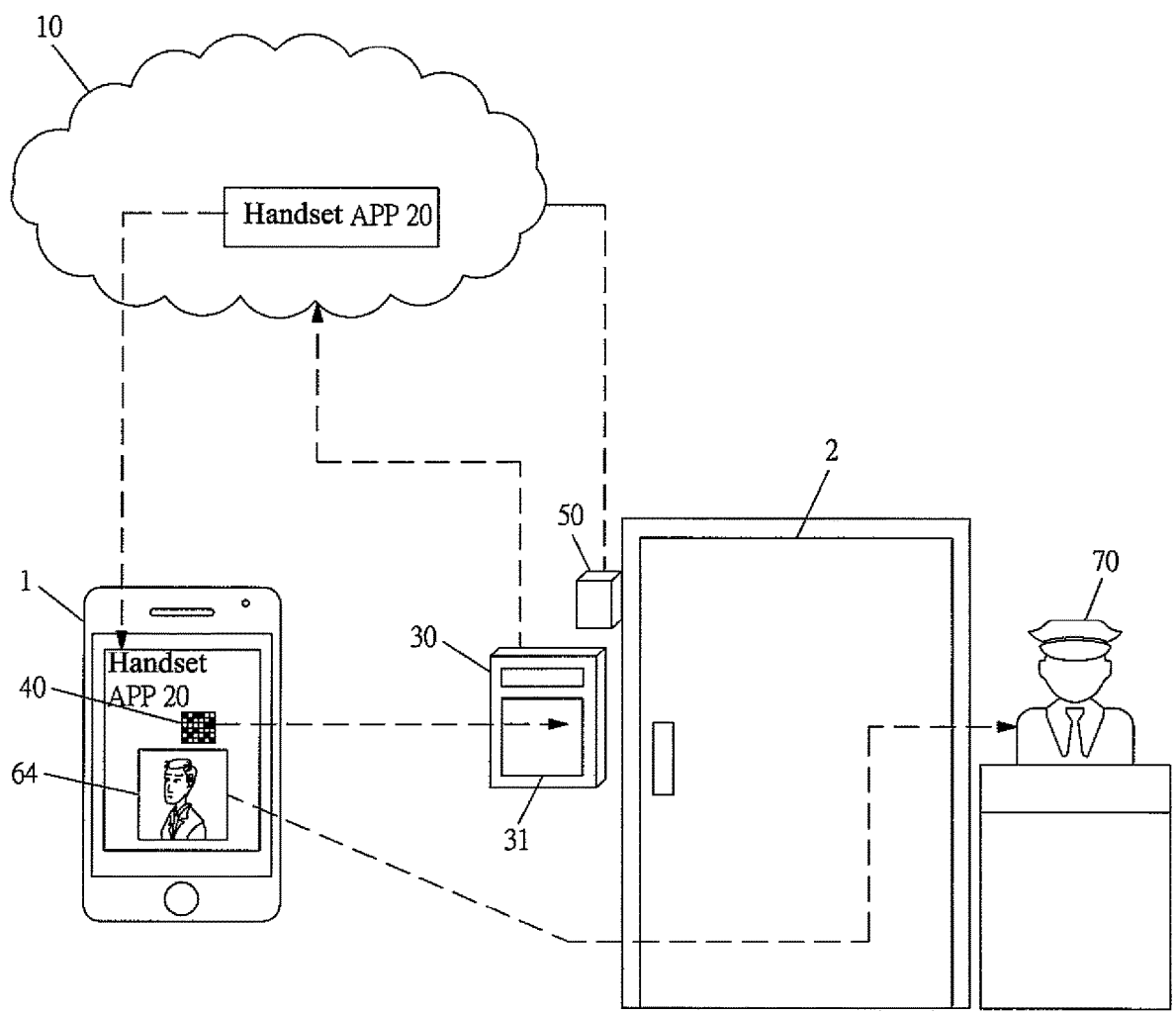
FIG. 5 is another assembly schematic view showing the main components of the present invention.

The cloud device 10 transmits mobile phone holder's image 64 to the user's mobile phone 1 by using short messages or email or APP of the user's mobile phone 1 in advance or at the time of opening the door 2 after receiving the notification from the user's mobile phone 1, As illustrated in FIG. 5, the mobile phone holder's image 64 can be displayed on the mobile phone 1 (for example, through the APP 30). Therefore a door keeper (or other identification person) 70 or an electronic image identification device can determine whether the mobile phone holder is the one permissible for entering into the doors by viewing the image displayed on the mobile phone 1. This is known in the prior art and therefore the details will not be further described herein.

The encoding way for the encoding unit 21 is time varied, that is, the QR code 40 from the encoding unit 21 is only retained for a preset time period. After the preset time period, the encoding unit 21 generates another QR code 40 for the encryption code of the door 2 to be opened, door time periods for opening the door and user's encryption code. The cloud device 10 also stores the encryption code of the door 2 to be opened, the door time periods for opening the door and the user's encryption code, and encrypting way of the encoding unit 21 and the specific encrypting code of the encoding unit 21. Therefore, the cloud device 10 can decode this QR code 40 generated by the encoding unit 21.

A card reader 30 is positioned on the door 2 and is signally connected to the cloud device 10. The card reader 30 serves to read the QR code 40 in the mobile phone 1 and transfers the QR code 40 to the cloud device 10 for decoding. The card reader 30 includes a reading device 31 (such as a scanner) for reading the QR code 40, and a transceiver 32 for transferring the QR code 40 to the cloud device 10.

When the cloud device 10 receives the QR code 40 from the card reader 30, the QR code 40 is decoded to get the encryption code 61 of the door 2 to be opened, door time periods 62 for opening the door and user's encryption code 63. These decoding data is compared with the respective the encryption code of the door 2 to be opened, door time periods for opening the door and user's encryption code stored in the cloud device 10. If they are matched, the card reader 30 transfers a signal for opening the door 2 to the door 2 for opening the door. If in the comparing, they are unmatched, the cloud device 10 transfers an error message to the mobile phone 1.

Figure 3:
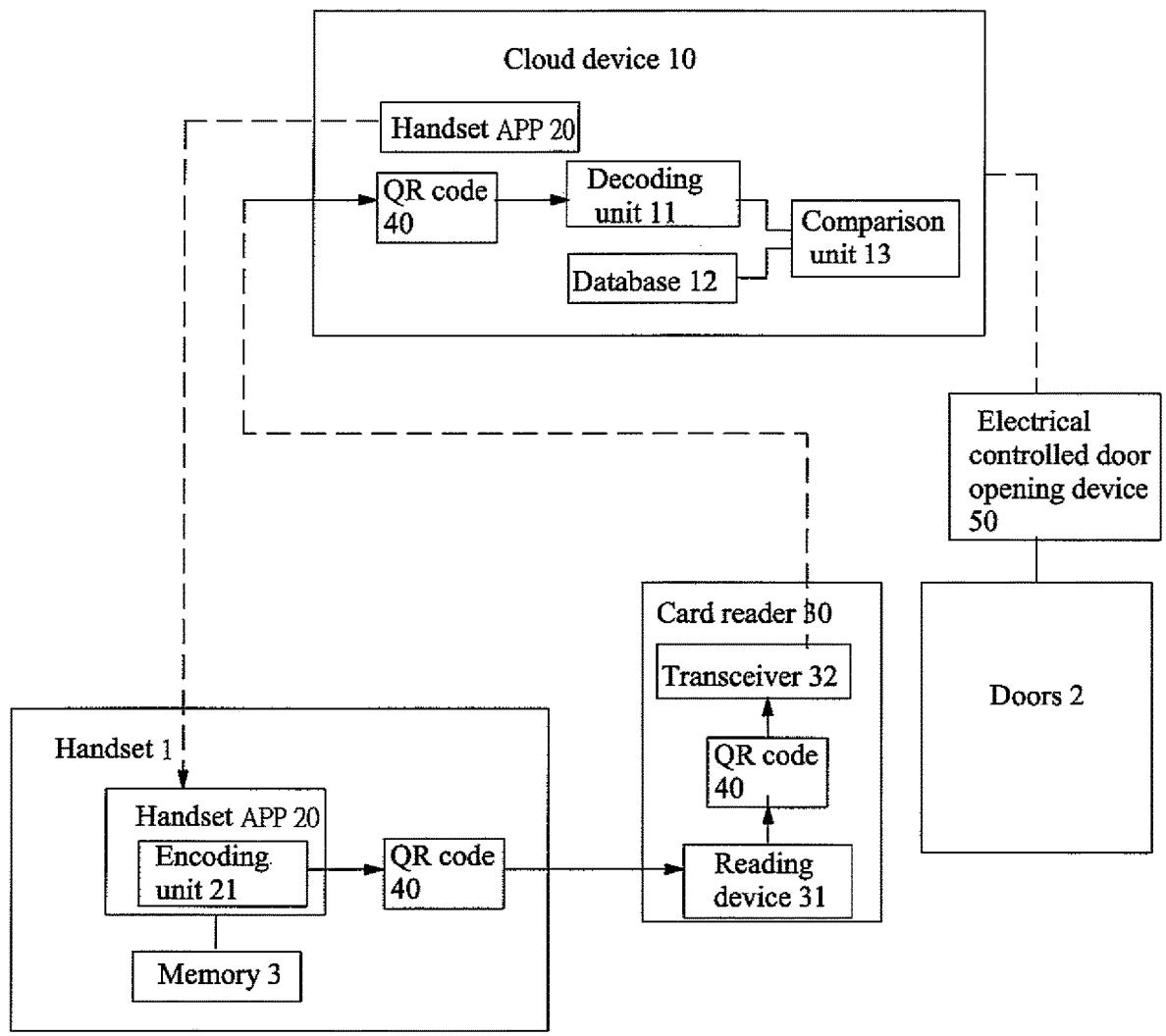
FIG. 3 is a schematic view showing the operation of the present invention.

With referring to FIGS. 2, 3 and 6, the cloud device 10 further comprises:

A decoding unit 11 serve to decode the QR code 40 transferred from the card reader 30 so as to get the encryption code 61 of the door 2 to be opened, the door time periods 62 for opening the door and the user's encryption code 63. The decoding unit 11 stores the encryption way and the specific encrypting code which are identical to those of the mobile phone APP 20 for decoding the QR code 40.

A database 12 stores the encryption code 61 of the door 2 to be opened, the door time periods 62 for opening the door and the user's encryption code 63, and indications of doors which are permitted to be passed by specific users.

A comparison unit 13 is connected to the database 12 and the decoding unit 11. The comparison unit 13 serves to compare encryption code 61 of the door 2 to be opened, the door time periods 62 for opening the door and the user's encryption code 63 decoded by the decoding unit 11 from the decoding unit 11 with the encryption code of the door 2 to be opened, the door time periods for opening the door and the user's encryption code stored in the database 12.

An electrical controlled door opening device 50 is connected to the door 2 for receiving the door opening signal from the cloud device 10.

Figure 4:
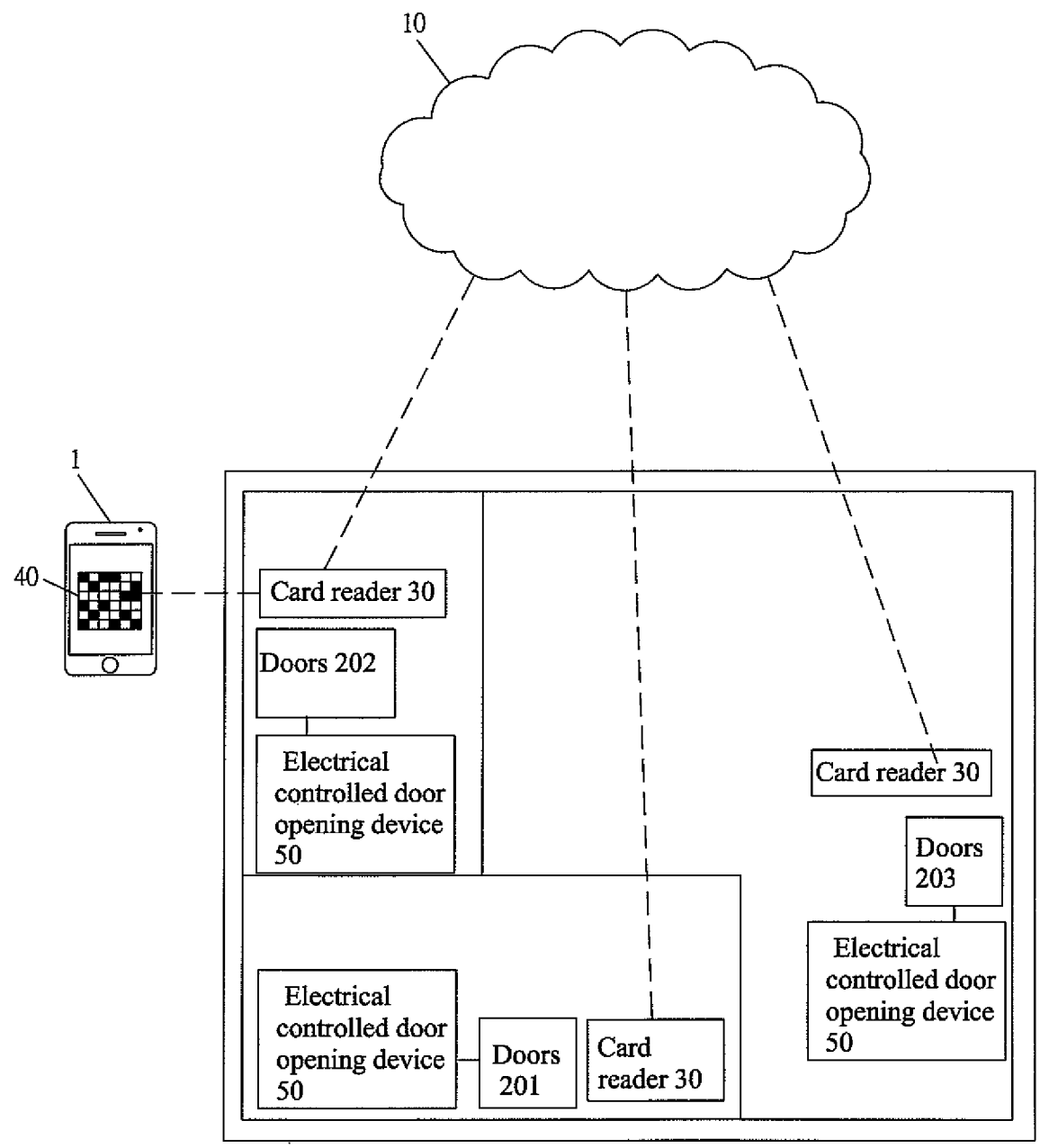
FIG. 4 shows an application example of the present invention.

With reference to FIG. 4, it is illustrated that there are many doors 201, 202, 203 in one unit 100. Each door has a respective card reader 30 which are connected to the cloud device 10. Therefore, cloud device 10 can control all the doors 201, 202 and 203 through the card readers 30. Furthermore, the mobile phone holder's image 64 can be used for identification of the mobile phone holder by door keepers, identification persons or electronic identification devices 70. These technologies are well known in the art, and thus the details will not be further described herein.

Advantages of the present invention are that the controller (that is the cloud device 10) are installed in cloud, instead of being at the door end. QR code is transferred to the cloud device and then is decoded and identified in the cloud device. The cost for installing the controllers is saved. Furthermore, a plurality of doors in one unit use same system and door control is performed by the cloud device. Furthermore the messages for door control and users are stored in the cloud device and thus it is unnecessary to worry about the stealing of the message. Furthermore, the cloud device may transfer the mobile phone holder's image to the mobile phone and displayed therein so that the door keepers, identification persons or electronic identification devices can further determine whether the person is one who is permissible to enter into. Thus the present invention provides a double checking function to users. Further, the cloud device can understand the status of various doors in the unit and thus can monitor different areas in the unit effectively.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A cloud door lock control system with identification of time varied 2D codes and images, comprising:
a cloud device for transmitting a mobile phone APP to a mobile phone; the cloud device storing all encryption codes of doors to be opened, time periods for opening the doors, and user's encryption codes; the cloud device frequently transmitting the encryption codes of doors to be opened, the time periods for opening the doors, and the user's encryption codes to the mobile phone based on a preset period through a first communication channel and the mobile phone stores these values in a memory;
a mobile phone APP for receiving the encryption codes of doors to be opened, the time periods for opening the doors, and the user's encryption codes emitted from the cloud device;
wherein in use, the cloud device further transmits the user's encryption code to a user by a second communication channel; the user's encryption code is inputted to a mobile phone with a mobile phone APP to replace the previous user's encryption code stored in the mobile phone APP and then the user's encryption code is stored in the memory in the mobile phone; the mobile phone APP includes an encoding unit which uses an specific encrypting code to further encrypting the encryption
wherein the mobile phone holder's image is transferred to the mobile phone APP by which the mobile phone holder's image is displayable on the mobile phone for determining whether the mobile phone holder is acceptable to pass through the door.

2. The cloud door lock control system with identification of time varied 2D codes and images as claimed in claim 1, wherein the mobile phone holder's images is at least one of static photos or at least one dynamic video.

3. The cloud door lock control system with identification of time varied 2D codes and images as claimed in claim 1, wherein the way for transferring the encryption code of the door and the door time periods is that: at a preset timing before opening the door, the cloud device transfers them to the mobile phone APP of the mobile phone by short messages or emails or by directly transferring to the mobile phone, or by other ways; or when the user desires to open the door, the mobile phone of the user notifies the cloud device, and then the cloud device transfers the encryption code of the door to be opened, and the door time periods.

4. The cloud door lock control system with identification of time varied 2D codes and images as claimed in claim 3, wherein the cloud device controls specific ones of doors; in opening the specific door, the mobile phone of the user notifies the cloud device to open the specific door which is identified by predetermined ways, then the cloud device transfers the encryption code of the specific door to be opened, and the door time periods of the specific doors.

5. The cloud door lock control system with identification of time varied 2D codes and images as claimed in claim 1, wherein the cloud device transmits mobile phone holder's image to the user's mobile phone by using short messages or email or APP of the user's code of the door to be opened, the door time periods for opening the door and the user's encryption code and then converting them into a QR code;
wherein the encoding way for the encoding unit is time varied, that is, the QR code from the encoding unit is only retained for a preset time period; after the preset time period has elapsed, the encoding unit generates another QR code for the encryption code of the door to be opened, the door time periods for opening the door and the user's encryption code; the cloud device also stores the encryption code of the door to be opened, the door time periods for opening the door and the user's encryption code, and encrypting way of the encoding unit and the specific encrypting codes of the encoding unit; and therefore, the cloud device can decode the QR code generated by the encoding unit;
a card reader positioned on the door and signally connected to the cloud device; the card reader serving for reading the QR code in the mobile phone and transfers the QR code to the cloud device fora decoding; and
wherein when the cloud device receives the QR code from the card reader, the QR code is decoded to obtain the encryption code of the door to be opened, the door time periods for opening the door and the user's encryption code; these decoding data is compared with the respective the encryption code of the door to be opened, door time periods for opening the door and user's encryption code stored in the cloud device; if they are matched, the card reader transfers a signal for opening the door to the door for opening the door; if in the comparing, they are unmatched, the cloud device transfers an error message to the mobile phone; and
wherein the cloud device stores mobile phone holder's images; where the mobile phone holder means a person who are acceptable by the cloud device to enter into the doors and the mobile phone holder has relations to the mobile phone;
mobile phone in advance or at the time of opening the door after receiving the notification from the user's mobile phone.

6. The cloud door lock control system with identification of time varied 2D codes and images as claimed in claim 1, wherein an electrical controlled door opening device is connected to the door for receiving the door opening signal from the cloud device.

7. The cloud door lock control system with identification of time varied 2D codes and images as claimed in claim 1, wherein in actuation, the cloud device further transfers the user's encryption code to the user's mobile phone and then to the mobile phone APP.

8. The cloud door lock control system with identification of time varied 2D codes and images as claimed in claim 1, wherein the card reader includes a reading device for reading the QR code, and a transceiver for transferring the QR code to the cloud device.

9. The cloud door lock control system with identification of time varied 2D codes and images as claimed in claim 1, wherein the cloud device further comprises:
- a decoding unit for decoding the QR code transferred from the card reader so as to obtain the encryption code of the door to be opened, the door time periods for opening the door and the user's encryption code; the decoding unit stores the encryption way and specific encrypting code which are identical to those of the mobile phone APP for decoding the QR code;
- a database storing the encryption code of the door to be opened, the door time periods for opening the door and the user's encryption code; and indications about doors which are permitted to be passed by specific users; and
- a comparison unit connected to the database and the decoding unit; the comparison unit serving to compare the encryption code of the door to be opened, the door time periods for opening the door and the user's encryption code decoded by the decoding unit decoding from the decoding unit with the encryption code of the door to be opened, the door time periods for opening the door and the user's encryption code stored in the database;
- wherein the database further stores the mobile phone holder's images; and the comparison has a function of image comparison for identifying the mobile phone holder's images.

10. The cloud door lock control system with identification of time varied 2D codes and images as claimed in claim 1, wherein there are many doors in one unit; and each door has a respective card reader which are connected to the cloud device; and therefore, cloud device can control all the doors through the card readers.

\* \* \* \* \*